(12) United States Patent
Zhai et al.

(10) Patent No.: US 12,726,538 B2
(45) Date of Patent: Sep. 1, 2026

(54) OPTIMIZING DATA SYNCHRONIZATION LATENCY IN LOAD BALANCING

(71) Applicant: Microsoft Technology Licensing, LLC, Redmond, WA (US)

(72) Inventors: Weiting Zhai, Bellevue, WA (US); Jason Brian Upham, Atlanta, GA (US); Karl Porus Buhariwala, Sammamish, WA (US); Shashwat Ajmani, Bellevue, WA (US); Xiang Chen, Bellevue, WA (US); Hamza Sahri, Atlanta, GA (US); Kiran Nallabothula, Redmond, WA (US); Run Yang, Redmond, WA (US); Xiangqing Zhang, Bellevue, WA (US); Laura Patrice-Ol Callahan, Seattle, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/744,552

(22) Filed: Jun. 14, 2024

(65) Prior Publication Data

US 2025/0385945 A1 Dec. 18, 2025

(51) Int. Cl.

| | |
|---|---|
| ***H04L 67/1021*** | (2022.01) |
| ***H04L 41/16*** | (2022.01) |
| ***H04L 67/1097*** | (2022.01) |

(52) U.S. Cl.

CPC .......... *H04L 67/1021* (2013.01); *H04L 41/16* (2013.01); *H04L 67/1097* (2013.01)

(58) Field of Classification Search

None

See application file for complete search history.

(56) References Cited

U.S. PATENT DOCUMENTS

| | | | |
|---|---|---|---|
| 8,930,518 | B2 | 1/2015 | Dharmalingam |
| 10,581,982 | B2 | 3/2020 | Georgiou |

(Continued)

FOREIGN PATENT DOCUMENTS

| | | | |
|---|---|---|---|
| CN | 116483904 | A | 7/2023 |

OTHER PUBLICATIONS

Wang et al., "OXDP: Offloading XDP to SmartNIC for Accelerating Packet Processing", Jan. 1, 2023, IEEE, 2022 IEEE 28th International Conference on Parallel and Distributed Systems (ICPADS) (2022, pp. 754-761) (Year: 2022).*

(Continued)

*Primary Examiner* — Davoud A Zand

(74) *Attorney, Agent, or Firm* — Barta Jones, PLLC

(57) ABSTRACT

Optimization of data synchronization latency when load balancing requests is provided. A request directed to a first server device in the first region is offloaded to a second server device in a second region that is different from the first region for load balancing. Data is generated based on processing the request by the second server device in the second region. A target region of a client device requesting the generated data is dynamically determined such that the target region is different from the second region. The generated data is stored in a datastore of the target region of the client device requesting the generated data. Thus, data is advantageously directly stored in the region(s) where clients are requesting that data without needing to wait for eventual synchronization of data to the region(s) where clients are requesting that data.

20 Claims, 6 Drawing Sheets

(56) References Cited

U.S. PATENT DOCUMENTS

| | | | | |
|---|---|---|---|---|
| 10,795,884 | B2 | 10/2020 | Bhattacharjee et al. | |
| 11,061,851 | B2 * | 7/2021 | Morishita | G06F 15/17 |
| 11,470,182 | B1 | 10/2022 | Virtser | |
| 2014/0289303 | A1 * | 9/2014 | Tarricone | H04L 67/10 709/201 |
| 2020/0293193 | A1 * | 9/2020 | Littlefield | G06F 11/1451 |
| 2022/0057918 | A1 * | 2/2022 | Rose | G06Q 20/4016 |
| 2023/0275959 | A1 | 8/2023 | Pahwa | |

OTHER PUBLICATIONS

Chen, et al., "Dynamic Load Balance for Hot-spot and Unbalance Region Problems in HBase," IEEE International Conference on Big Data, 2020, pp. 2583-2589.

Google Cloud, "External Application Load Balancer use cases", accessed on URL: https://cloud.google.com/load-balancing/docs/https/use-cases, published on Apr. 16, 2024, Retrieved on May 29, 2024, 8 pages.

Kubo, et al., "On improving latency of geographically distributed key-value stores via load balancing with side information," IEEE International Conference on Communications (ICC), Jun. 9, 2013, pp. 3710-3715.

* cited by examiner

OPTIMIZING DATA SYNCHRONIZATION LATENCY IN LOAD BALANCING

BACKGROUND

Cloud-based services often follow a producer-consumer model that separates the creation of data from its processing. Traffic in a cloud-based service depends on working hours for a region (e.g., EastUS, WestUS, India, etc.). For example, a large majority of the traffic is processed by server devices in the regions during the working hours while the server devices in the regions that are outside of the working hours sit idle. In current systems, datastore write regions are static, and write to datastores in the closest region. In load balancing scenarios, this is not necessarily the best strategy because the region that needs the data may not be close by and require eventual consistency through synchronization, which slows down access to the updated data.

For example, during traffic spikes, a global service identifies that a particular region is busy processing requests and queues the request to a server device of another region that is sitting idle or having a limited load. The server device of the other region stores the generated data (e.g., the result of processing the request) in a data store located closest to the region of the server device. Eventually, the data store will synchronize the generated data with other data stores in other regions. However, during the time when the generated data is not yet synchronized, client devices still poll the server devices in their respective regions, which introduces latency and increased processing load as well as consumes memory and bandwidth due to repeated polling for the generated data that is not yet available to the client devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for optimizing data synchronization latency when load balancing requests is described. A request directed to a first server device in the first region is offloaded to a second server device in a second region that is different from the first region for load balancing. Data is generated based on processing the request by the second server device in the second region. A target region of a client device requesting the generated data is determined. The target region is different from the second region. The generated data is stored in a datastore of the target region of the client device requesting the generated data.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Examples of the disclosure optimize data synchronization latency when a request directed to a first server device in a first region is offloaded to a second server device in a second region due to load balancing. The second server device in the second region generates data based on processing the request and dynamically determines a target region of a client device requesting the generated data. The target region is different from the second region. Examples of the disclosure advantageously store the generated data in a datastore of the target region of the client device requesting the generated data rather than in a datastore of the second server device in the second region. In this way, latency for the client device is reduced or otherwise optimized because the client device does not need to wait for the datastore of the second server device in the second region to synchronize with the datastore of the target region of the client device requesting the generated data.

For example, if processing the request to generate data (e.g., generate idea, perform a data write, etc.) takes 8 seconds, storing the data in a datastore takes 2 seconds, and synchronizing the data with other datastores takes 2 seconds, the generated data will be available to the client device in a conventional system in 12 seconds (i.e., 8 seconds for data processing +2 seconds for storing the data in closest datastore of the server device +2 seconds for synchronizing the data with other datastores). In contrast, the generated data is available to the client device implementing the examples of the disclosure in 10 seconds (i.e., 8 seconds for data processing +2 seconds of round-trip time for storing the data in datastore of the target region of the client device requesting the generated data) resulting in reducing the latency by 2 seconds. In this example, this is a savings of more than 16% over conventional systems. Further, rather than the client devices repeatedly polling their local datastores for the generated data during the time when the generated data is not yet synchronized, the client devices are able to access the generated data sooner which results in consumption of less bandwidth, processing, and memory resources.

Figure 1:
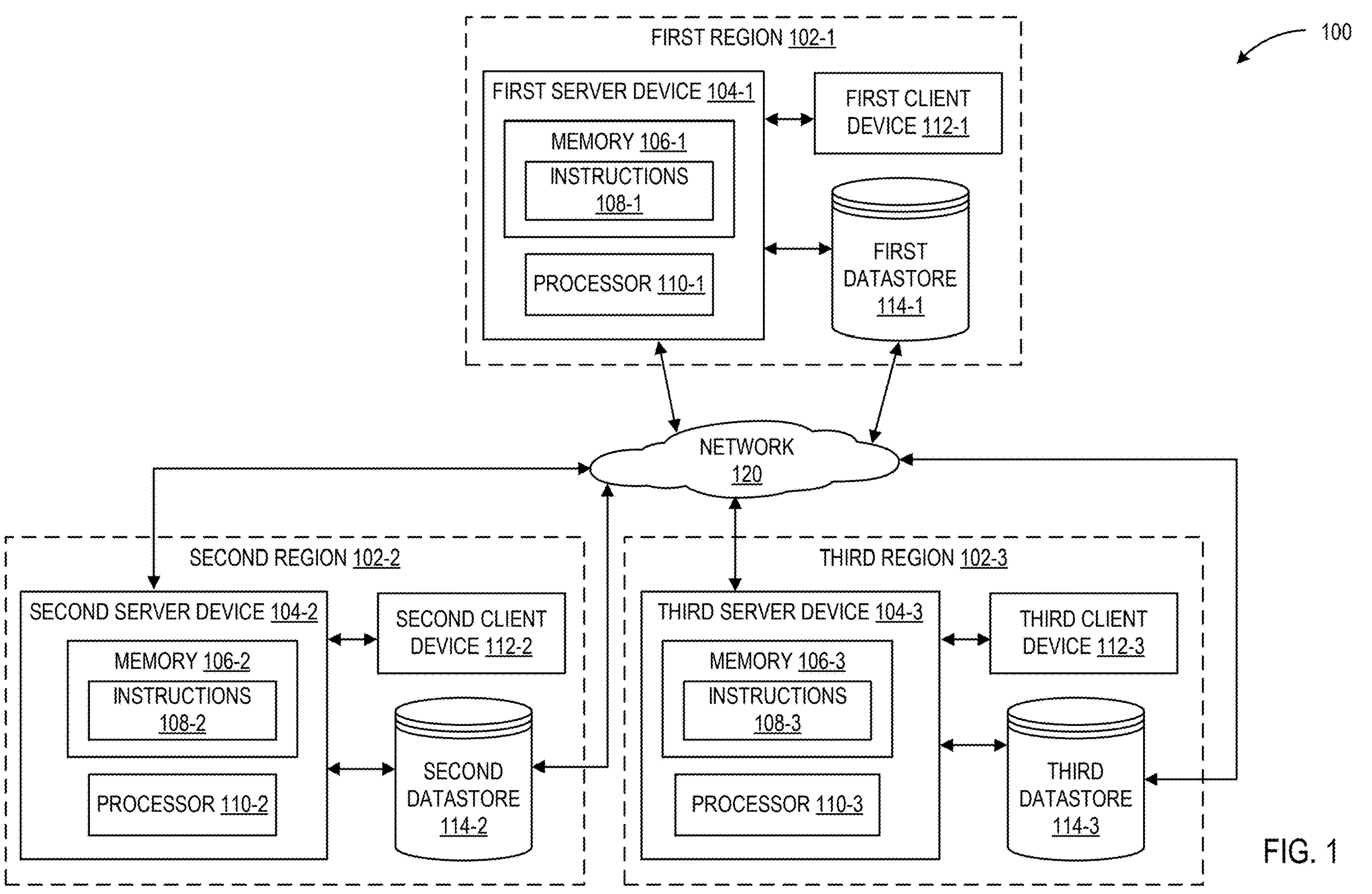
FIG. 1 illustrates a block diagram of an example system for optimizing data synchronization latency.

FIG. 1 is a block diagram illustrating a system 100 for optimizing data synchronization latency when load balancing requests among server devices distributed over a plurality of regions. In FIG. 1, three regions 102-1, 102-2, and 102-3 are shown in system 100. In some examples, system 100 may include more than three regions or only two regions without deviating from the disclosure.

For example, first region 102-1 includes a first server device 104-1, a first client device 112-1, and a first datastore 114-1. The first server device 104-1 comprises a memory 106-1 and a processor 110-1. The memory 106-1 comprises instructions 108-1 that upon execution by the processor 110-1 perform operations illustrated in FIGS. 4 and 5. Similarly, the second region 102-2 includes a second server device 104-2, a second client device 112-2, and a second datastore 114-2. The second server device 104-2 comprises a memory 106-2 and a processor 110-2. The memory 106-2 comprises instructions 108-2 that upon execution by the processor 110-2 perform operations illustrated in FIGS. 4 and 5. Similarly, the third region 102-3 includes a third server device 104-3, a third client device 112-3, and a third datastore 114-3. The third server device 104-3 comprises a memory 106-3 and a processor 110-3. The memory 106-3 comprises instructions 108-3 that upon execution by the processor 110-3 perform operations illustrated in FIGS. 4 and 5.

For ease of illustration and understanding, each region 102-1, 102-2, and 102-3 is shown to include a single server device (e.g., 104-1, 104-2, and 104-3 respectively), a single client device (e.g., 112-1, 112-2, and 112-3 respectively), and a single datastore (e.g., 114-1, 114-2, and 114-3 respectively). However, there may be more server devices, client devices, and datastores in each region without deviating from the disclosure.

Server devices can communicate with each other and the datastores across the regions over the network 120. For example, the first server device 104-1 in the first region 102-1 communicates with the second server device 104-2 and the second datastore 114-2 in the second region 102-2 over the network 120. Similarly, the first server device 104-1 in the first region 102-1 communicates with the third server device 104-3 and the third datastore 114-3 in the third region 102-3 over the network 120. Server device 104-2 in the region 102-2 can similarly communicate with the other server devices (104-1 and 104-3) and datastores (114-1 and 114-3) in other regions (102-1 and 102-3) over the network 120. Similarly, server device 104-3 in the region 102-3 can similarly communicate with the other server devices (104-1 and 104-2) and datastores (114-1 and 114-2) in other regions (102-1 and 102-2) over the network 120.

In some examples, a request is received from a first client device 112-1 in a first region 102-1 for processing data by a first server device 104-1 in the first region 112-1. A request for data or for processing data is usually directed from a client device to a server device in nearest location to the client device and the resulting data or the processed data is usually stored by a server device in a datastore of the nearest location to the server device. For example, the request from a first client device 112-1 in the first region 102-1 for processing data is directed to the first server device 104-1 in the first region 112-1 because the first server device is located nearest to the first client device 112-1. However, due to load balancing (e.g., if the first server device 104-1 is busy or unavailable for any reason), the request for processing the data is offloaded to a second server device 104-2 in a second region 102-2.

The request for processing data is offloaded to the second server device 104-2 in the second region 102-2 based on one or more of a workload of the first server device 104-1 in the first region 102-1 and metadata associated with the workload. For example, if the workload is related to virtual machines and this type of workload is to be processed in a particular region (e.g., dues to availability of devices in that region), the metadata associated with the workload itself and/or the metadata of why the workload is running in that region are used to determine where the processing of the data is to be offloaded. The second server device 104-2 in the second region 102-2 processes the data to generate processed data.

In a conventional system, the processed data of this example would have been stored in the second datastore 114-2 that is located nearest to the second server device 104-2 and the processed data would eventually be synchronized with the first datastore 114-1 and/or the third datastore 114-3 for data consistency. The time taken for this synchronization is the latency experienced by the first client device 112-1 and/or the third client device 112-3 waiting for the processed data in the conventional system. In contrast, examples of the disclosure eliminate or at least reduce this latency due to synchronization because the processed data is made available at the datastores (e.g., the first datastore 114-1 and/or the third datastore 114-3) nearest to the client device (e.g., the first client device 112-1 and/or the third client device 112-3) waiting to consume the processed data, as soon as the processed data is available.

In some examples, the request for processing data includes an identifier of the target region (e.g., 102-1) of the second client device (e.g., when the requesting client device 112-1 is the consumer as well) and this identifier is used to determine the target region (e.g., 102-1 is determined to be the target region). In some examples, when the second server device 104-2 in the second region 102-2 processes the data to generate processed data, the client device (e.g., the first client device 112-1 and/or the third client device 112-3) waiting to consume the processed data communicate their region (e.g., first region 102-1 and/or third region 102-3) via their server device (e.g., the first server device 102-1 and/or the third server device 104-3) to the second server device 104-2. In some other examples, historical data of target regions of a plurality of client devices that request data similar to the processed data is analyzed using a machine learning model and the target region of the second client device requesting the processed data is dynamically determined based on the analyzing. If the dynamically determined target region of the second client device requesting the processed data is determined to be accurate or inaccurate, the machine learning model is updated so that accuracy of target region determination using the machine learning model is improved.

In this way, the second server device 104-2 dynamically determines a target region (e.g., first region 102-1 and/or third region 102-3) of a second client device (e.g., first client device 112-1, another client device (not shown) in the first region 102-1 or third region 102-3, and/or third client device 112-3) requesting the processed data where the target region (e.g., first region 102-1 and/or third region 102-3) is different from the second region 102-2. In some examples, the target region (e.g., 102-3) is different from the first region (e.g., 102-1) and the first client device (e.g., 112-1) is different from the second client device (e.g., another client device (not shown) in the third region 102-3 or the third client device 112-3). In some other examples, the target region (e.g., 102-1) is same as the first region (e.g., 102-1) and the first client device (e.g., 112-1) is same as or different from the second client device (e.g., another client device (not shown) in the first region 102-1).

Now that the second server device 104-2 knows the target region (e.g., first region 102-1 and/or third region 102-3) of the client device requesting the processed data, the processed data is stored in a datastore (e.g., 114-1 and/or 114-3) of the target region of the second client device (e.g., first client device 112-1, another client device (not shown) in the first region 102-1 or third region 102-3, and/or third client device 112-3) requesting the processed data. In this way, the processed data is advantageously available to the client device requesting the processed data without waiting for data synchronization in datastores in their nearest location.

In some examples, another target region (e.g., 102-3) of a third client device (e.g., 112-3) requesting the processed data is dynamically determined, where the other target region (e.g., 102-3) being different from the second region (e.g., 102-2) and the first region (e.g., 102-1). In such examples, the processed data is stored in a datastore (e.g., 114-3) of the other target region (e.g., 102-3) of the third client device (e.g., 112-3) requesting the processed data. Storing the processed data in the datastore (e.g., 114-3) of the other target region (e.g., 102-3) of the third client device (e.g., 112-3) is performed in parallel with the storing the processed data in the datastore (e.g., 114-1) of the target region (e.g., 102-1) of the second client device (e.g., first client device 112-1 or another client device (not shown) in the first region 102-1).

Figure 2:
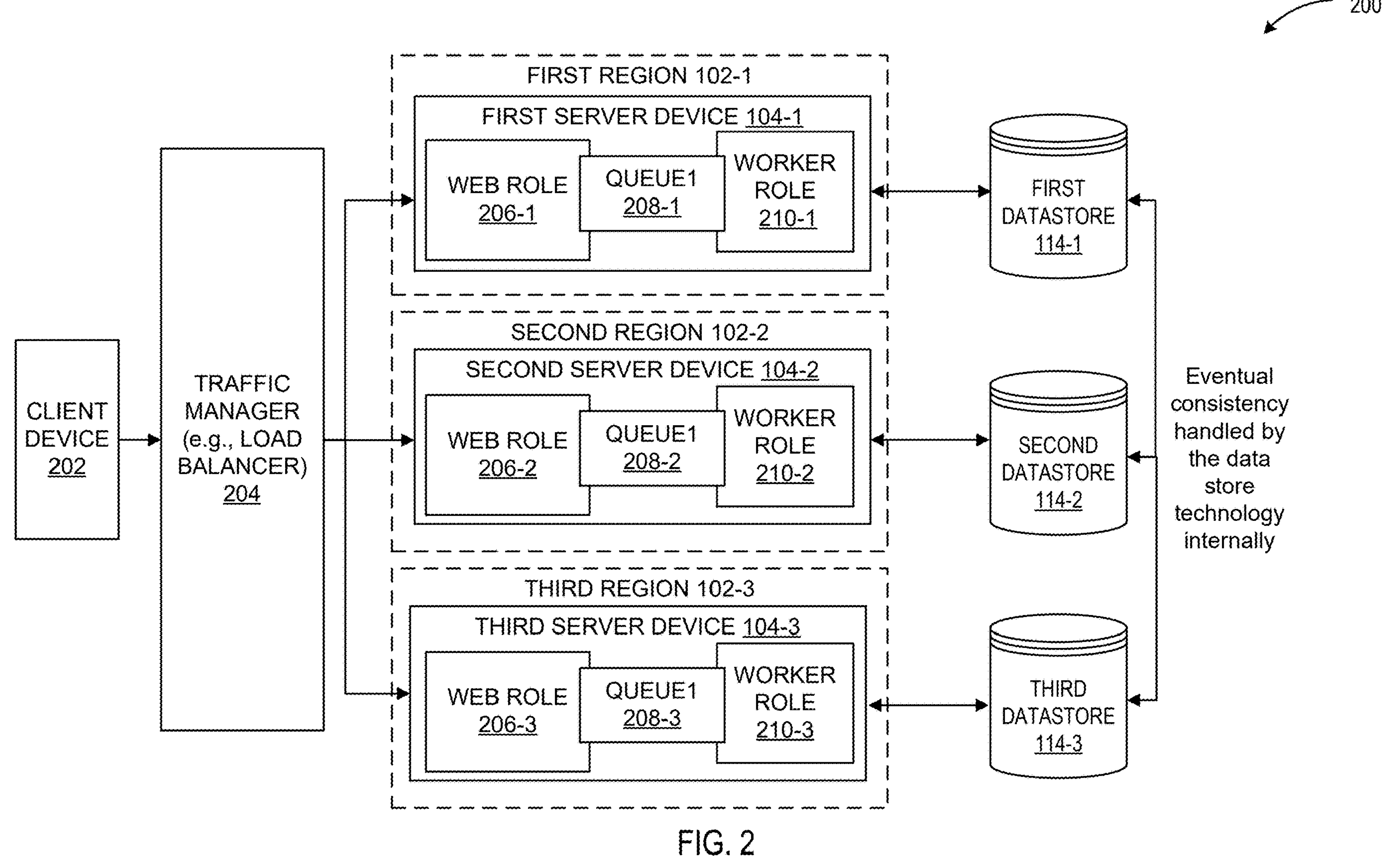
FIG. 2 illustrates a block diagram of an example architecture for optimizing data synchronization latency.

FIG. 2 is a block diagram of an example architecture 200 for optimizing data synchronization latency when load balancing requests. In the architecture 200 of FIG. 2, three regions 102-1, 102-2, and 102-3 are shown. In some examples, architecture 200 may include more than three regions or only two regions without deviating from the disclosure.

For example, first region 102-1 includes a first server device 104-1 having a first datastore 114-1 closest to the first region 102-1. The first server device 104-1 comprises a web role 206-1 that utilizes a queue 208-1 to send requests for data processing to worker role 210-1. Similarly, second region 102-2 includes a second server device 104-2 having a second datastore 114-2 closest to the second region 102-2. The second server device 104-2 comprises a web role 206-2 that utilizes a queue 208-2 to send requests for data processing to worker role 210-2. Similarly, the third region 102-3 includes a third server device 104-3 having a third datastore 114-3 closest to the third region 102-3. The third server device 104-3 comprises a web role 206-3 that utilizes a queue 208-3 to send requests for data processing to worker role 210-3. The datastores 114-1, 114-2, and 114-3 provide multiple read and write regions to offer regional resiliency.

In some examples, a request for data or data processing from a client device 202 is received by a traffic manager or load balancer 204 which directs incoming user traffic to the appropriate regional deployment based on routing rules (e.g., performance, priority, geographic location). When the client device 202 is closest to the first region 102-1, the client device 202 requests or polls for result of the request from the first server device 104-1 (which the client device 202 expects will process the request store in the first datastore 114-1 located closest to the first server device 104-1) being nearest to the client device 202. In some examples, the load balancer 204, sends the request for processing by the second server device 104-2 where the request is queued in the queue 208-2 by the web role 206-2 for processing by the worker role 210-2.

In a conventional system, the worker role 210-2 of the second server device 104-2 stores the result of processing at the second datastore 114-2 that is closest to the second region 102-2 whereas the client device 202 polls the first server device 104-1 or the first datastore 114-1 closest to the first region 102-1. Even though the eventual consistency handled by the datastore technology will synchronize the processed data on the first datastore 114-1 as well, the client device 202 experiences additional latency due to the synchronization of the processed data on the first datastore 114-1, in the conventional system.

In contrast, examples of the disclosure advantageously eliminate or reduce this latency experienced by the client device 202. In some examples, the request includes an identifier of the target region of the client device 202 where the client device 202 will poll for the processed data (the first server device 104-1 or the first datastore 114-1 closest to the first region 102-1 in this example). Thus, the worker role 210-2 of the second server device 104-2 knows that the client device 202 will expect the processed data from the first datastore 114-1 and therefore stores the processed data directly on the first datastore 114-1 via the network 120 of FIG. 1 (not shown in FIG. 2). In this example, the eventual constancy handled by the datastore 114-1 will synchronize the processed data at the other datastores (i.e., the second datastore 114-2 and the third datastore 114-3).

In some examples, if another client device (not shown) (say closest to the third region 102-3) also polls for processed data from the third server device 104-3 or the third datastore 114-3. The load balancer 204 sends an identifier of the target region of the other client device where the other client device will poll for the processed data (the third server device 104-3 or the third datastore 114-3 closest to the third region 102-3 in this example). Thus, the worker role 210-2 of the second server device 104-2 knows that the other client device will expect the processed data from the third datastore 114-3 and therefore stores the processed data directly on the third datastore 114-3 via the network 120 of FIG. 1 (not shown in FIG. 2). The worker role 210-2 of the second server device 104-2 stores the processed data on the first datastore 114-1 and the third datastore 114-3 in parallel. In this example, the eventual constancy handled by the datastores 114-1 and/or 114-3 will synchronize the processed data at the other datastore (i.e., the second datastore 114-2).

Figure 3:
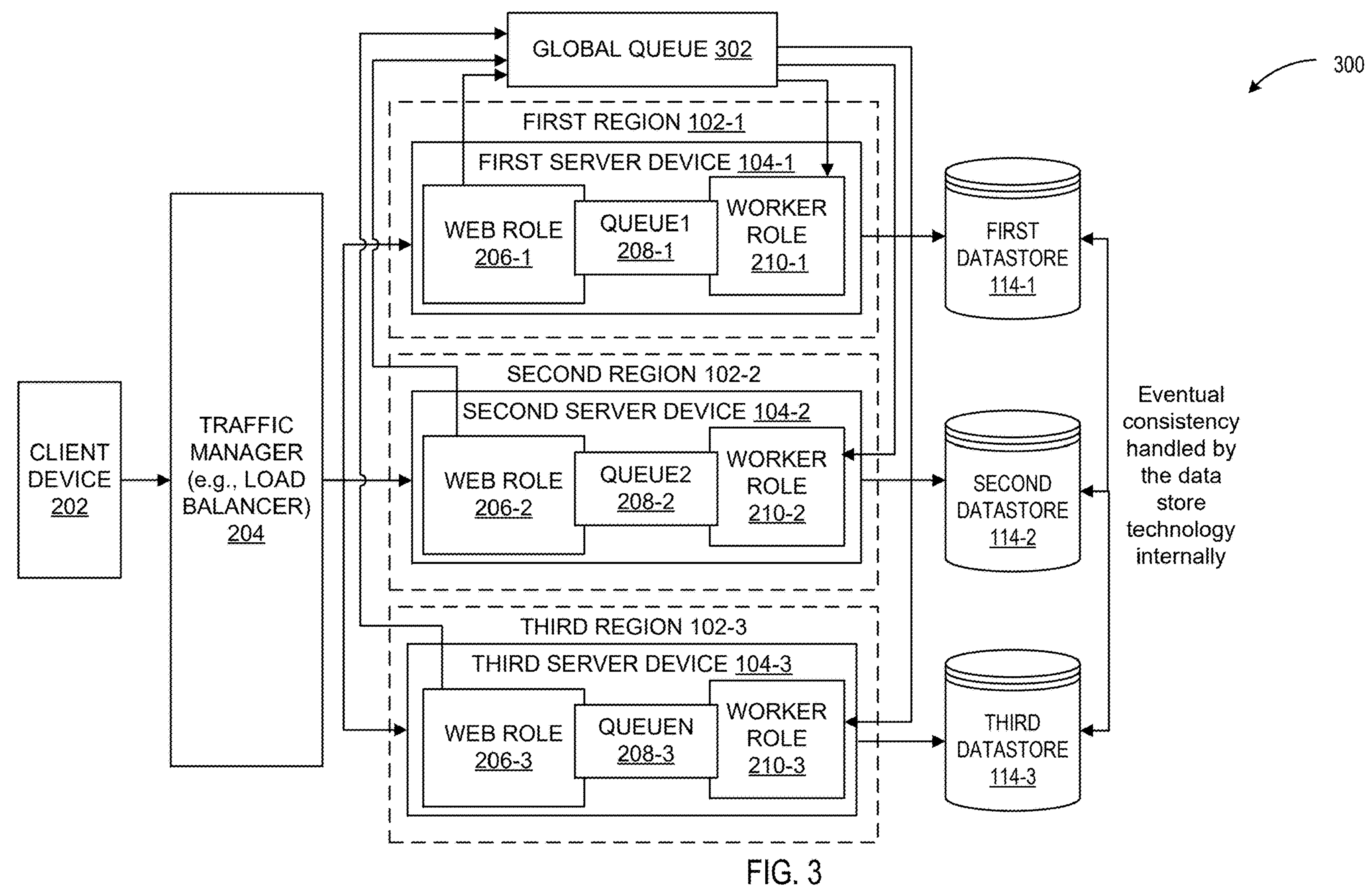
FIG. 3 illustrates a block diagram of an example architecture for optimizing data synchronization latency using a global queue.

FIG. 3 illustrates a block diagram of an example architecture 300 for optimizing data synchronization latency when load balancing requests using a global queue 302. The architecture 300 of FIG. 3 is similar to the architecture 200 of FIG. 2 with the addition of the global queue 302. In the architecture 300 of FIG. 3, three regions 102-1, 102-2, and 102-3 are shown. In some examples, architecture 300 may include more than three regions or only two regions without deviating from the disclosure.

For example, first region 102-1 includes a first server device 104-1 having a first datastore 114-1 closest to the first region 102-1. The first server device 104-1 comprises a web role 206-1 that utilizes a queue 208-1 to send requests for data processing to worker role 210-1. However, if the worker role 210-1 can no longer process further requests, the web role 206-1 queues the upcoming requests in the global queue 302 which is listened to by the all worker roles (210-1, 210-2, and 210-3). Similarly, second region 102-2 includes a second server device 104-2 having a second datastore 114-2 closest to the second region 102-2. The second server device 104-2 comprises a web role 206-2 that utilizes a queue 208-2 to send requests for data processing to worker role 210-2. However, if the worker role 210-2 can no longer process further requests, the web role 206-2 queues the upcoming requests in the global queue 302 which is listened to by the all worker roles (210-1, 210-2, and 210-3). Similarly, the third region 102-3 includes a third server device 104-3 having a third datastore 114-3 closest to the third region 102-3. The third server device 104-3 comprises a web role 206-3 that utilizes a queue 208-3 to send requests for data processing to worker role 210-3. However, if the worker role 210-3 can no longer process further requests, the web role 206-3 queues the upcoming requests in the global queue 302 which is listened to by the all worker roles (210-1, 210-2, and 210-3). The datastores 114-1, 114-2, and 114-3 provide multiple read and write regions to offer regional resiliency and therefore are distributed across the globe in different regions.

In some examples, a request for data or data processing from a client device 202 is received by a traffic manager or load balancer 204 which directs incoming user traffic to the appropriate regional deployment based on routing rules (e.g., performance, priority, geographic location). When the client device 202 is closest to the first region 102-1, the client device 202 requests or polls for result of the request from the first server device 104-1 (which the client device 202 expects will process the request store in the first datastore 114-1 located closest to the first server device 104-1) being nearest to the client device 202. In some examples, the load balancer 204 and/or the web role 206-1 of the first server device 104-1 knows that the worker role 210-1 is busy and queues the request at the global queue 302 with an indication of the target region of the client device 202. The request is dequeued from the global queue 302 for processing by the second server device 104-2 where the request is queued in the queue 208-2 for processing by the worker role 210-2.

The worker role 210-2 of the second server device 104-2 knows that the client device 202 expects the processed data from the first datastore 114-1 and therefore stores the processed data directly on the first datastore 114-1 via the network 120 of FIG. 1 (not shown in FIG. 3). In this example, the eventual consistency functionality implemented by the datastore 114-1 synchronizes the processed data at the other datastores (i.e., the second datastore 114-2 and the third datastore 114-3).

In some examples, another client device (not shown) (e.g., closest to the third region 102-3) also polls for processed data from the third server device 104-3 or the third datastore 114-3. The load balancer 204 and/or the web role 106-3 sends an identifier of the target region of the other client device where the other client device will later poll for the processed data (the third server device 104-3 or the third datastore 114-3 closest to the third region 102-3 in this example) to the worker role 210-2 of the second server device 104-2. Thus, the worker role 210-2 of the second server device 104-2 knows that the other client device expects the processed data from the third datastore 114-3 and therefore the worker role 210-2 stores the processed data directly on the third datastore 114-3 via the network 120 of FIG. 1 (not shown in FIG. 3). The worker role 210-2 of the second server device 104-2 stores the processed data on the first datastore 114-1 and the third datastore 114-3 in parallel. In this example, execution of the eventual consistency functionality handled by the datastores 114-1 and/or 114-3 synchronizes the processed data at the other datastore (i.e., the second datastore 114-2).

Figure 4:
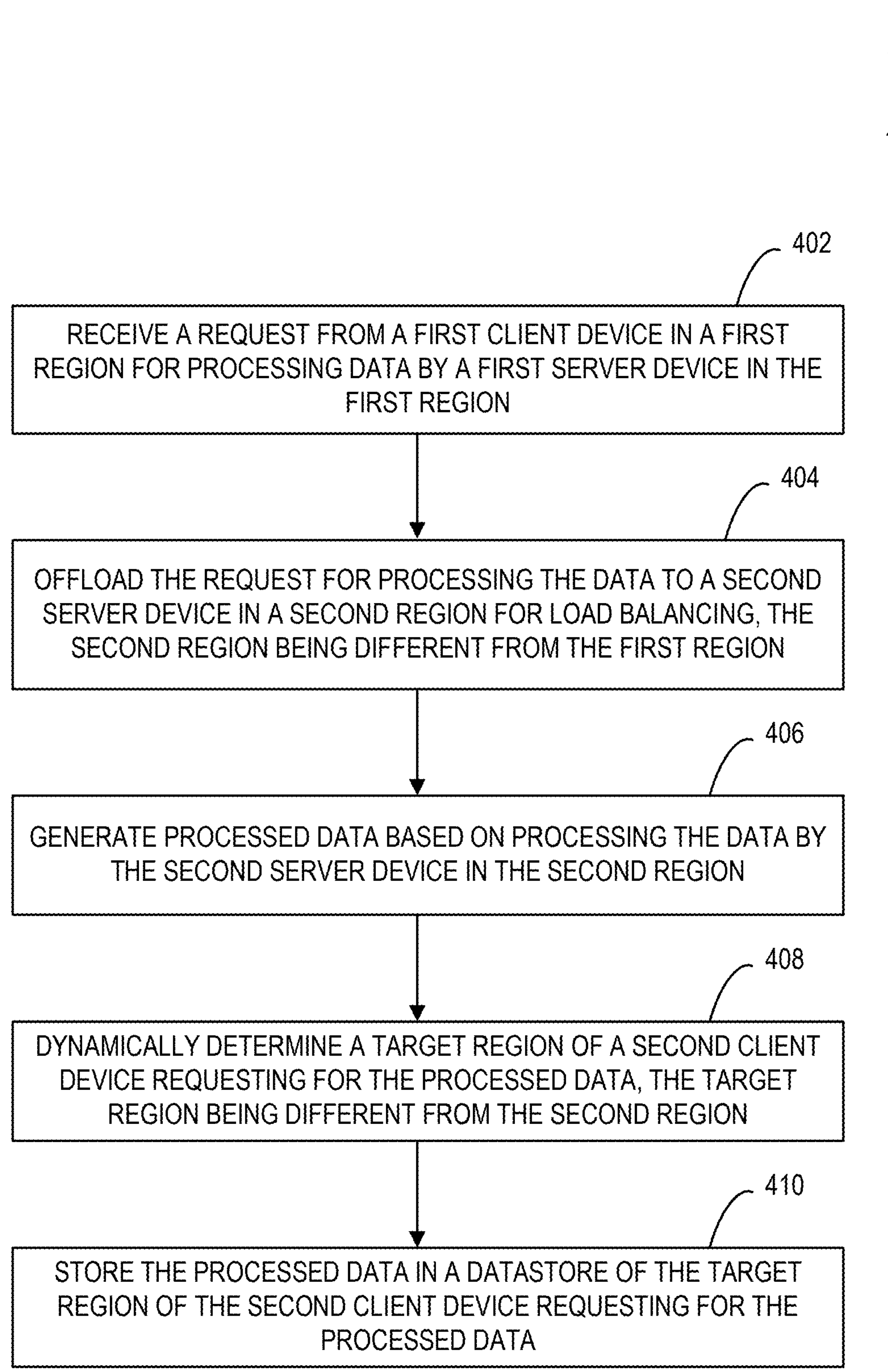
FIGS. 4-5 are flowcharts illustrating example methods for optimizing data synchronization latency.

FIG. 4 is a flowchart illustrating an example method 400 for optimizing data synchronization latency when load balancing requests. In some examples, the method 400 is executed or otherwise performed in a system such as system 100 of FIG. 1.

At 402, a request is received from a first client device in a first region for processing data by a first server device in the first region. At 404, the request for processing the data is offloaded to a second server device in a second region different from the first region for load balancing. At 406, processed data is generated based on processing the data by the second server device in the second region. At 408, a target region of a second client device requesting the processed data is dynamically determined, such that the target region is different from the second region. At 410, the processed data is stored in a datastore of the target region of the second client device requesting the processed data. In some examples, the target region is different from the first region and therefore the first client device is also different from the second client device. In some other examples, the target region is same as the first region and therefore the first client device is same as the second client device or the first client device is different from the second client device.

Figure 5:
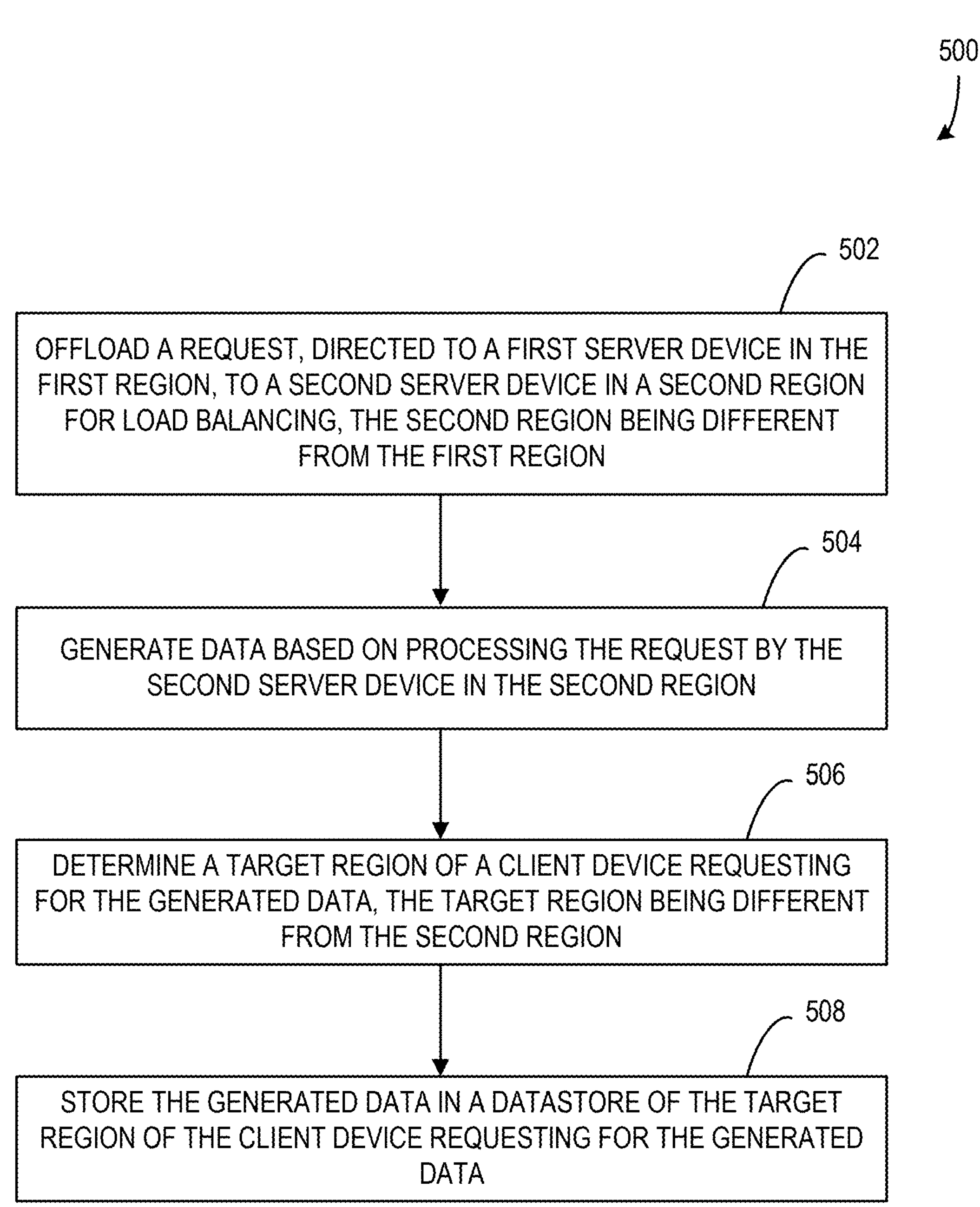

FIG. 5 is a flowchart illustrating an example method 500 for optimizing data synchronization latency when load balancing requests. In some examples, the method 500 is executed or otherwise performed in a system such as system 100 of FIG. 1.

At 502, a request directed to a first server device in the first region is offloaded to a second server device in a second region different from the first region for load balancing. At 504, data is generated based on processing the request by the second server device in the second region. At 506, a target region of a client device requesting the generated data is determined, such that the target region is different from the second region. In some examples, historical data of target regions of a plurality of client devices that request data similar to the generated data is analyzed using a machine learning model and the target region of the client device requesting the generated data is determined based on the analyzing. If it is determined that the determined target region of the client device requesting the generated data is accurate or inaccurate, the machine learning model is updated so that the updated machine learning model can be used to accurately determine the target region in future. At 508, the generated data is stored in a datastore of the target region of the client device requesting the generated data.

Additional Examples

In an example of a conventional system, a request from a client device in the EastUS region is received by a server device in the EastUS region for processing the request. However, the request is sent to a global queue by a server device in the EastUS region, e.g., due to a traffic spike at the server device in the EastUS region. From the global queue, the request is picked up by a server device in the SouthIndia region to process because of load balancing. The server device in the SouthIndia region, upon processing the request, writes the result to its closest instance of the data store when the result reaches a terminal state. When the server device in the SouthIndia region is processing the request, the client device still polls the server device in the EastUS region to know if the result has completed (i.e., data is available for the request). The server device in the EastUS region polls its closest instance of the data store to check if the result is in a terminal state (e.g., non-running state) which will not happen until the eventual consistency of the data store closest to the SouthIndia region makes the result reach the data store closest to the EastUS region as per the service level agreement defined by the synchronization strategy selected. For example, Bounded Staleness can have a maximum delay of 5 seconds. This latency is due to a Global Service Bus concept, as the write and read regions are different. In this example, the write region is the data store closest to the SouthIndia region and the read region is the data store closest to the EastUS region.

In contrast, examples of the disclosure eliminate this latency experienced in conventional systems. The server device in the SouthIndia region, in the example above, processes the request which takes a non-trivial amount of time (>10 s). While the server device in the SouthIndia region is processing the request, if the client device polls for the data, the best data store write region for the client device (e.g., the data store write region closest to the client device which is the EastUS region) is stored in the global queue along with the request or the best data store write region for the client device is provided by the server device in the EastUS region to the server device in the SouthIndia region. When the result of the diagnostic at the server device in SouthIndia region is ready, the server device in SouthIndia region dynamically determines the best write region to write the result to, e.g., the datastore closest to the EastUS region where the client device is located rather than choosing the static mapping which is determined during deployment of the region. There could be one write region (in case of a single client device) or multiple write regions (in case of multiple client devices across different regions). In this way, examples of the disclosure remove the unpredictability and latency involved in eventually bringing the data stores into consistency. This reduces total latency from a client device's perspective.

In an example, a video hosting website needs to do some processing on a video before hosting the video. The website has five data stores in different regions of the world (e.g., EastUS, WestUS, India, Europe, China, and Japan) to deliver the video to the users in their respective regions. In an example of a conventional system, when a user in the EastUS region uploads a video, the user receives an identifier and the video is received by a server device in the EastUS region. However, due to workload on the server device in the EastUS region, the request for processing video is sent to a server device in India which uploads the processed video to a datastore in India (e.g., closest to the server device in India). The processed video will eventually be synchronized with the data store in the EastUS region but this creates latency from the perspective of the user device.

In contrast, examples of the disclosure eliminate this latency because the server device in the India region dynamically determines the region of the user as EastUS region and first stores the processed video in the data store closest to the EastUS region (before synchronizing with the other data stores). This allows the user to access their video faster and not wait for the synchronization service to copy the video to the data store closest to the user.

In some examples, when a support ticket related to an issue/problem is created by a client device, a case list node or a ticket list node triggers a workload to run. The support ticket may be picked up randomly by support personnel in any region because at that point there is no user still waiting for the result of processing of the support ticket. However, if the support ticket is a high priority case, there could be client devices across the globe that start looking for the results of the diagnostics to start up and troubleshoot the case. For example, if the worker role of the India region is processing the support ticket and client devices in the EastUS and Europe regions are looking for the results of the processing, the worker role of India region will write the data at the data stores of the EastUS and Europe regions per examples of the disclosure. This eliminates or reduces the synchronization latency that would have been introduced by convention systems that write the result first in the data store of the India region and then synchronize the result to the EastUS and Europe regions.

Within a globally distributed database environment, there is a direct relationship between consistency level and data durability in the presence of a region-wide outage. The time period for update that the client devices can afford to lose is known as the recovery point objective (RPO). The below table defines the relationship between consistency level and data durability in the presence of a region-wide outage.

| Region(s) | Replication Mode | Consistency level | RPO |
|---|---|---|---|
| 1 | Single or multiple write regions | Any consistency level | <240 minutes |
| >1 | Single write region | Session, Consistent Prefix, Eventual | <15 minutes |
| >1 | Single write region | Bounded Staleness | K&T |
| >1 | Single write region | Strong | 0 |
| >1 | Multiple write regions | Session, Consistent Prefix, Eventual | <15 minutes |
| >1 | Multiple write regions | Bounded Staleness | K&T |

Here, K is a number of "K" versions (e.g., updates) of an item and T is the time interval "T" since the last update. For a single region account, the minimum value of K and T is 10 write operations or 5 seconds. For multi-region accounts, the minimum value of K and T is 100,000 write operations or 300 seconds. This value defines the minimum RPO for data using Bounded Staleness.

Strong consistency has the advantage that the latest processed data is available in each region and the disadvantage is that the write latency is increased because the processed data has to be written to all the instances of the datastores in each region simultaneously. Examples of the disclosure are implemented with a Bounded Staleness model which practices eventual consistency rather than strong consistency. With Bounded Staleness, the data may be stale until it is propagated or synchronized to all the data stores. However, eventually the latest data will be available across all the data stores upon completion of the data synchronization.

In some examples, the global queue 302 of FIG. 3 is utilized in around 1% of scenarios, otherwise the local queues (shown as 208-1, 208-2, and 208-3) in FIGS. 2 and 3) of the server devices are utilized in the remaining 99% of the scenarios. However, in both scenarios, client devices in examples of the disclosure do not have to wait for the datastore's synchronization service level agreement (SLA) to eventually finish synchronizing the data with the datastores in the regions where the client devices are located or the datastores in the regions where the client devices are likely to access the data.

In some examples, if the datastore closest to the client device is not available or not accessible (e.g., first datastore 114-1), the data processing server device (e.g., the second server device 104-2 in FIG. 1) writes the data to the next closest datastore to the client device (e.g., third datastore 114-3, if the third datastore 114-3 is closer than the second datastore 114-2) rather than to the datastore closest to the data processing server device (i.e., the second datastore 114-2 which is closest to the data processing server device 104-2 in FIG. 1).

Exemplary Operating Environment

Figure 6:
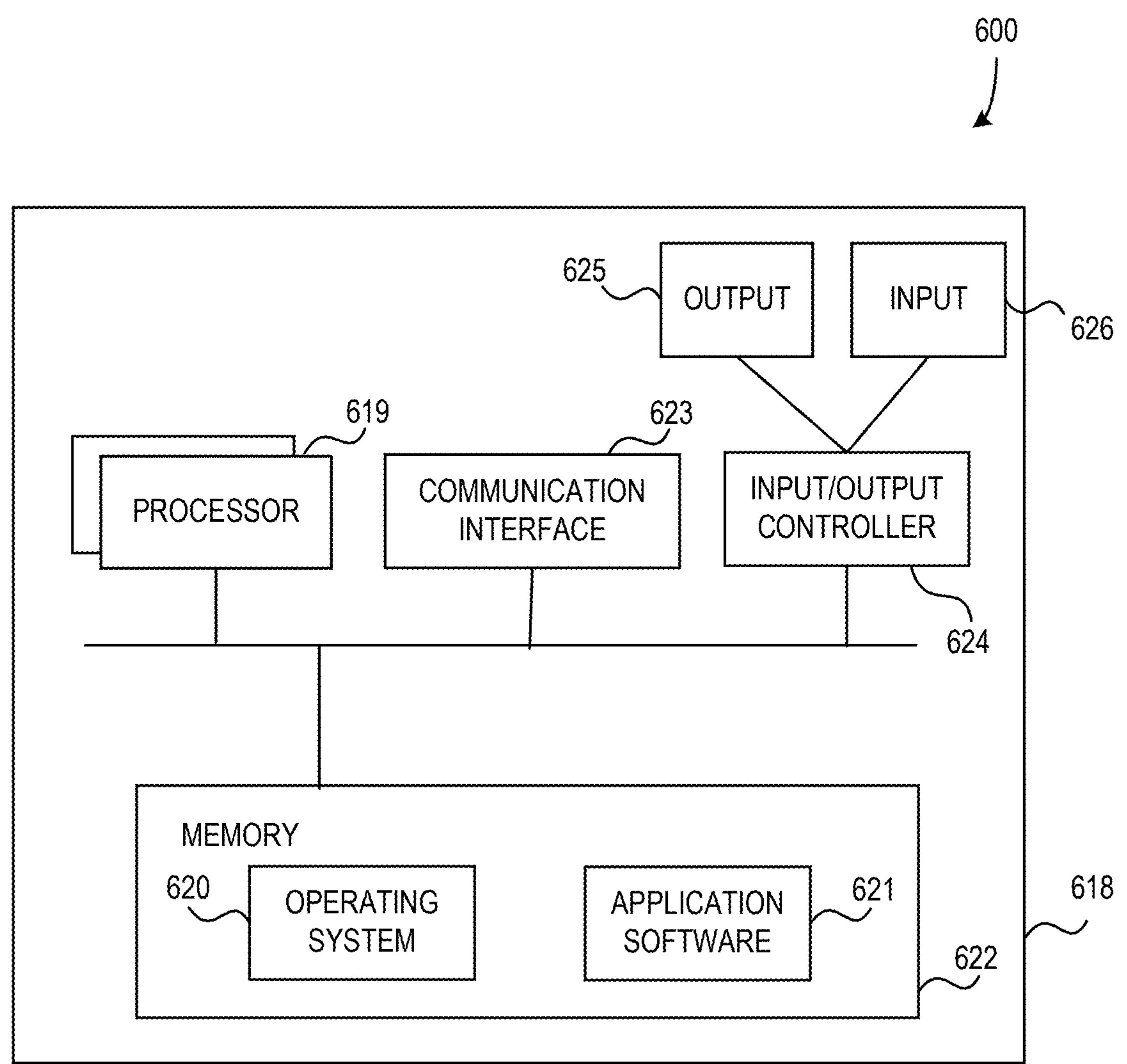
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, optimizing data synchronization latency when load balancing requests for generated data as described herein is accomplished by software, hardware, and/or firmware.

In some examples, computer executable instructions are provided using any computer-readable media that is accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not a propagating signal. Propagated signals are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application Specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory storing instructions that upon execution by the processor perform operations comprising: receiving a request from a first client device in a first region for processing data by a first server device in the first region; offloading the request for processing the data to a second server device in a second region for load balancing, the second region being different from the first region; generating processed data based on processing the data by the second server device in the second region; dynamically determining a target region of a second client device requesting the processed data, the target region being different from the second region; and storing the processed data in a datastore of the target region of the second client device requesting the processed data.

An example computerized method comprises offloading a request, directed to a first server device in a first region, to a second server device in a second region for load balancing, the second region being different from the first region; generating data based on processing the request by the second server device in the second region; determining a target region of a client device requesting the generated data, the target region being different from the second region; and storing the generated data in a datastore of the target region of the client device requesting the generated data.

An example computer storage medium stores computer-executable instructions that, upon execution by a processor, cause the processor to perform operations comprising: receiving a request from a first client device in a first region for processing by a first server device in the first region; offloading the request to a second server device in a second region for load balancing, the second region being different from the first region; generating data based on processing the request by the second server device in the second region; dynamically determining a target region of a second client device polling for the generated data, the target region being different from the second region; and storing the generated data in a datastore of the target region of the second client device polling for the generated data.

Alternatively, or in addition to the other examples described herein, examples include any combination of the following:

- analyzing, using a machine learning model, historical data of target regions of a plurality of client devices that request data similar to the processed data; and
- dynamically determining the target region of the second client device requesting the processed data based on the analyzing;
- determining that the dynamically determined target region of the second client device requesting the processed data is accurate or inaccurate; and
- based on the determining that the dynamically determined target region of the second client device requesting the processed data is accurate or inaccurate, updating the machine learning model.
- wherein the target region is different from the first region and the first client device is different from the second client device;
- wherein the target region is same as the first region and the first client device is same as or different from the second client device;
- dynamically determining another target region of a third client device requesting the processed data, the other target region being different from the second region and the first region; and
- storing the processed data in a datastore of the other target region of the third client device requesting the processed data;
- wherein the storing the processed data in the datastore of the other target region of the third client device is performed in parallel with the storing the processed data in the datastore of the target region of the second client device;
- wherein the request for processing data is offloaded to the second server device in the second region based on one or more of a workload of the first server device in the first region and metadata associated with the workload;
- wherein the request for processing data includes an identifier of the target region of the second client device, wherein the target region is dynamically determined based on the identifier of the target region;
- analyzing, using a machine learning model, historical data of target regions of a plurality of client devices that request data similar to the generated data; and
- determining the target region of the client device requesting the generated data based on the analyzing;
- determining that the determined target region of the client device requesting the generated data is accurate or inaccurate; and
- based on the determining that the determined target region of the client device requesting the generated data is accurate or inaccurate, updating the machine learning model;
- wherein the target region is different from the first region or the target region is same as the first region;
- determining another target region of another client device requesting the generated data, the other target region being different from the second region and the first region; and
- storing the generated data in a datastore of the other target region of the other client device requesting the generated data;
- wherein the storing the generated data in the datastore of the other target region of the other client device is performed in parallel with the storing the generated data in the datastore of the target region of the client device;
- wherein the request is offloaded to the second server device in the second region based on one or more of a workload of the first server device in the first region and metadata associated with the workload;
- wherein the request includes an identifier of the target region of the client device, wherein the target region of the client device is determined based on the identifier of the target region;
- wherein the target region is different from the first region and the first client device is different from the second client device or the target region is same as the first region and the first client device is same as or different from the second client device;
- dynamically determining another target region of a third client device polling for the generated data, the other target region being different from the second region and the first region; and
- storing the generated data in a datastore of the other target region of the third client device polling for the generated data, wherein the storing the generated data in the datastore of the other target region of the third client device is performed in parallel with the storing the generated data in the datastore of the target region of the second client device.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving a request from a first client device in a first region for processing data by a first server device in the first region; exemplary means for offloading the request for processing the data to a second server device in a second region for load balancing, the second region being different from the first region; exemplary means for generating processed data based on processing the data by the second server device in the second region; exemplary means for dynamically determining a target region of a second client device requesting the processed data, the target region being different from the second region; and exemplary means for storing the processed data in a datastore of the target region instead of in a datastore of the second region.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory storing instructions that upon execution by the processor perform operations comprising:

receiving a request from a first client device in a first region for processing data by a first server device in the first region;

offloading the request for processing the data to a second server device in a second region for load balancing, the second region being different from the first region;

generating processed data based on processing the data by the second server device in the second region;

dynamically determining a target region of a second client device requesting the processed data, the target region being different from the second region; and storing the processed data in a datastore of the target region instead of in a datastore of the second region.

2. The system of claim 1, wherein the instructions upon execution by the processor perform further operations comprising:

analyzing, using a machine learning model, historical data of target regions of a plurality of client devices that request data similar to the processed data; and dynamically determining the target region of the second client device requesting the processed data based on the analysis.

3. The system of claim 2, wherein the instructions upon execution by the processor perform further operations comprising:

determining that the dynamically determined target region of the second client device requesting the processed data is accurate or inaccurate; and based on the determination that the dynamically determined target region of the second client device requesting the processed data is accurate or inaccurate, updating the machine learning model.

4. The system of claim 1, wherein the target region is different from the first region and the first client device is different from the second client device.

5. The system of claim 1, wherein the target region is same as the first region and the first client device is same as or different from the second client device.

6. The system of claim 1, wherein the instructions upon execution by the processor perform further operations comprising:

dynamically determining another target region of a third client device requesting the processed data, the other target region being different from the second region and the first region; and storing the processed data in a datastore of the other target region of the third client device requesting the processed data.

7. The system of claim 6, wherein the storing the processed data in the datastore of the other target region of the third client device is performed in parallel with the storing the processed data in the datastore of the target region of the second client device.

8. The system of claim 1, wherein the request for processing data is offloaded to the second server device in the second region based on one or more of a workload of the first server device in the first region and metadata associated with the workload.

9. The system of claim 1, wherein the request for processing data includes an identifier of the target region of the second client device, wherein the target region is dynamically determined based on the identifier of the target region.

10. A computerized method comprising:

offloading a request, directed to a first server device in a first region, to a second server device in a second region for load balancing, the second region being different from the first region;

generating data based on processing the request by the second server device in the second region;

determining a target region of a client device requesting the generated data, the target region being different from the second region; and storing the generated data in a datastore of the target region.

11. The computerized method of claim 10, further comprising:

analyzing, using a machine learning model, historical data of target regions of a plurality of client devices that request for data similar to the generated data; and determining a target region of the client device requesting the generated data based on the analysis.

12. The computerized method of claim 11, further comprising:

determining that the determined target region of the client device requesting the generated data is accurate or inaccurate; and based on the determination that the determined target region of the client device requesting the generated data is accurate or inaccurate, updating the machine learning model.

13. The computerized method of claim 10, wherein the target region is different from the first region or the target region is same as the first region.

14. The computerized method of claim 10, further comprising:

determining another target region of another client device requesting the generated data, the other target region being different from the second region and the first region; and storing the generated data in a datastore of the other target region of the other client device requesting the generated data.

15. The computerized method of claim 14, wherein the storing the generated data in the datastore of the other target region of the other client device is performed in parallel with the storing the generated data in the datastore of the target region of the client device.

16. The computerized method of claim 10, wherein the request is offloaded to the second server device in the second region based on one or more of a workload of the first server device in the first region and metadata associated with the workload.

17. The computerized method of claim 10, wherein the request includes an identifier of the target region of the client device, wherein the target region of the client device is determined based on the identifier of the target region.

18. A computer storage medium storing computer-executable instructions that, upon execution by a processor, cause the processor to perform operations comprising:

receiving a request from a first client device in a first region for processing by a first server device in the first region;

offloading the request to a second server device in a second region for load balancing, the second region being different from the first region;

generating data based on processing the request by the second server device in the second region;

dynamically determining a target region of a second client device polling for the generated data, the target region being different from the second region; and storing the generated data in a datastore of the target region of the second client device polling for the generated data.

19. The computer storage medium of claim 18, wherein the target region is different from the first region and the first client device is different from the second client device or the target region is same as the first region and the first client device is same as or different from the second client device.

20. The computer storage medium of claim 18, wherein the computer-executable instructions upon execution by the processor further cause the processor to perform operations comprising:

dynamically determining another target region of a third client device polling for the generated data, the other target region being different from the second region and the first region; and storing the generated data in a datastore of the other target region of the third client device polling for the generated data, wherein the storing the generated data in the datastore of the other target region of the third client device is performed in parallel with the storing the generated data in the datastore of the target region of the second client device.

* * * * *